No. 694,504. Patented Mar. 4, 1902.
J. C. WANDS.
SIDE BEARING FOR RAILWAY CARS.
(Application filed Aug. 23, 1901.)

(No Model.) 2 Sheets—Sheet 1.

Attest:
G. A. Pennington
George Bakewell

Inventor:
John C. Wands,
by Bakewell & Cornwall
Attys.

THE NORRIS PETERS CO., PHOTO-LITHO., WASHINGTON, D. C.

No. 694,504. Patented Mar. 4, 1902.
J. C. WANDS.
SIDE BEARING FOR RAILWAY CARS.
(Application filed Aug. 23, 1901.)
(No Model.) 2 Sheets—Sheet 2.

Attest:
G. A. Pennington
George Bakewell.

Inventor:
John C. Wands,
by Bakewell & Cornwall
Attys.

THE NORRIS PETERS CO., PHOTO-LITHO., WASHINGTON, D. C.

UNITED STATES PATENT OFFICE.

JOHN C. WANDS, OF ST. LOUIS, MISSOURI.

SIDE BEARING FOR RAILWAY-CARS.

SPECIFICATION forming part of Letters Patent No. 694,504, dated March 4, 1902.

Application filed August 23, 1901. Serial No. 73,046. (No model.)

*To all whom it may concern:*

Be it known that I, JOHN C. WANDS, a citizen of the United States, residing at the city of St. Louis, State of Missouri, have invented a certain new and useful Improvement in Side Bearings for Railway-Cars, of which the following is a full, clear, and exact description, such as will enable others skilled in the art to which it appertains to make and use the same, reference being had to the accompanying drawings, forming part of this specification, in which—

Figure 1:
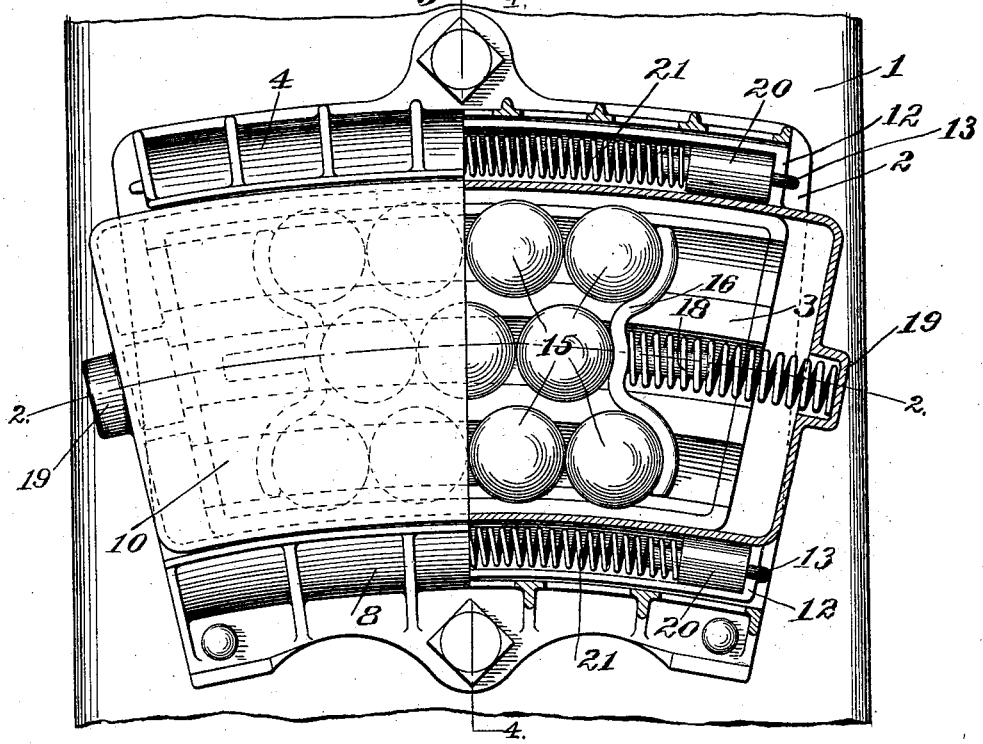
Figure 2:
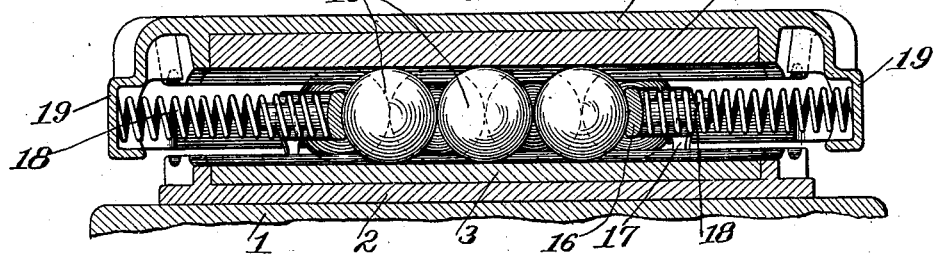
Figure 3:
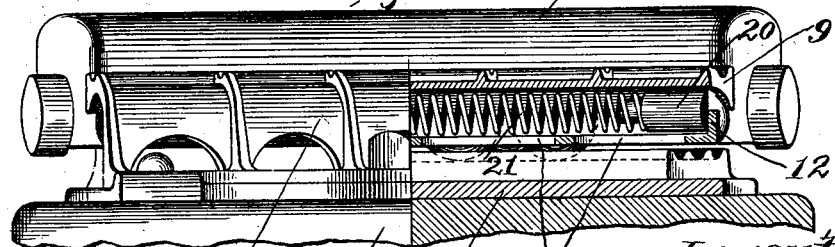
Figure 5:
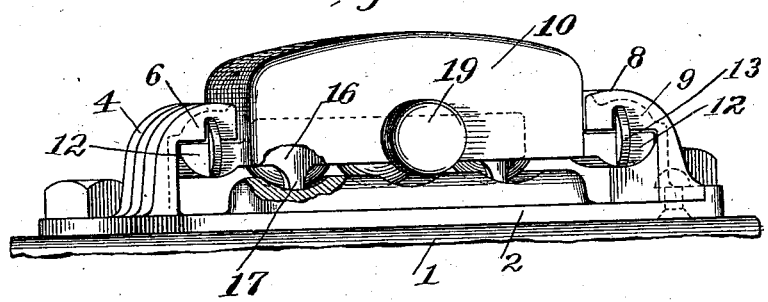
Figure 6:
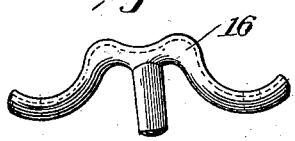
Figure 7:
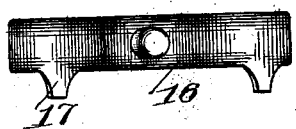

Figure 1 is a top plan view, partly in horizontal section, of my improved side bearing. Fig. 2 is a vertical sectional view on line 2 2, Fig. 1. Fig. 3 is a side elevational view, partly in section, on line 4 4, Fig. 1. Fig. 5 is an end elevational view. Fig. 6 is a plan view of the ball-yoke, and Fig. 7 is an elevational view of the same.

This invention relates to a new and useful improvement in side bearings designed for use in connection with railway rolling-stock.

The side bearing shown in the accompanying drawings is of that type known as "ball" side bearing, and in practice is arranged at or near the ends of the truck-bolster on each side of the center plate or bearing, said truck-bolster side bearings coöperating with the side bearings arranged on the body-transom, which transom forms the support for one end of the car-body.

The objects of this present invention are to arrange the bearing-plate, which coöperates with the said bearing of the body-transom, said bearing-plate being movable in an arc of a circle described from the king-pin of the truck. Antifriction-balls are arranged under the bearing-plate, and in addition to forming supports therefor also facilitate the movement thereof. Renewable top and bottom races are provided for the balls, the former being seated in a recess in the under side of the bearing-plate, while the latter is arranged in the face of the base-plate. Both of these races are preferably made of hard metal, as are also the balls, while the bearing-plate and base-plate are made of relatively soft or ductile metal, such as malleable iron. The antifriction-rollers are nested or grouped, they being confined between yokes, which yokes are forced inward toward each other by springs having bearings at their outer ends against the end walls of the bearing-plate. These springs restore the group of balls to a normal or central position. Springs are also arranged at the sides of the bearing-plate in suitable housings for restoring the bearing-plate to a central position.

The above briefly-described construction is simple in arrangement, compact, cheap, and easy of assemblage and repair.

With these objects in view the invention consists in the construction, arrangement, and combination of the several parts, all as will hereinafter be described, and afterward pointed out in the claims.

In the drawings, 1 indicates a portion of the truck-bolster, which may be of any ordinary or approved type.

2 indicates a base-plate, preferably in the form of a malleable-iron casting, which is secured in some suitable manner to the bolster 1.

3 indicates a track-plate or bottom ball-race, preferably separable from the base-casting, being introduced into the upper surface thereof and held in a fixed position by appropriate flanges. As shown in Fig. 1, this ball-race is provided with a series of concaved grooves described from an arc of circle of which the king-pin of the truck is the center.

Figure 4:
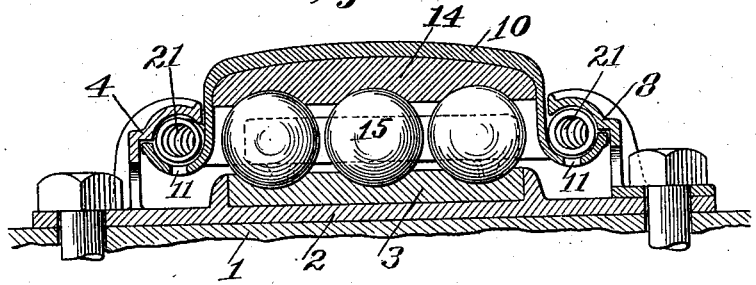

4 indicates an overhanging hood, preferably integral with the base-plate 1, which hood, as shown in the drawings, extends along the inner side of the base-plate from end to end thereof. This hood is preferably curved in an arc of a circle described from the king-pin. Referring to Figs. 1 and 4, it will be seen that this hood is reinforced by strengthening-ribs arranged at suitable distances apart, between which the vertical web which supports the hood is cut away (see Fig. 3) for the purpose of admitting free circulation of air through the openings thus provided. Referring to Fig. 5, it will be observed that the hood is provided with end walls 6, which form abutments for the spring-follower received by the hood.

8 indicates a hood corresponding substantially in all respects to the overhanging hood 4, with the exception that the overhanging hood 8 is removable and is secured by suitable fastening devices to the base-plate 1. The vertical web of this overhanging hood is also formed with openings to permit air to circulate freely therethrough, and hood 8 is also provided with strengthening-ribs and end abutments 9.

10 indicates a bearing-plate whose upper surface is convexed in order to make contact with the top bearing on the body-transom at a point where the weight transmitted through said top bearing will be central with respect to the movable bearing-plate 10.

The bearing-plate 10 is in the form of an inverted box, the end walls thereof terminating above the base-plate 1, while the side walls extend laterally, forming what might be termed "trough-shaped flanges," which coöperate with the overhanging hoods 4 and 8 and form housings for the springs. These trough-shaped flanges are preferably provided with openings or slots in their bottom walls, so as to permit the escape of dust and cinders, while the side walls of the bearing-plate are formed with elongated openings or slots 11. The trough-shaped flanges are provided with end walls 12, which are reinforced by ribs 13, said ribs extending above the end walls and passing through suitable openings in the end walls of the overhanging hoods.

14 indicates a wear-plate arranged on the under side of the bearing-plate and designed to coöperate with the antifriction-balls. This bearing-plate or ball-race is preferably made of hard metal and formed on its under face with concaved grooves described from an arc of a circle of which the king-pin is the center.

15 indicates balls arranged in the grooves of the top and bottom ball-races, said balls being preferably staggered with respect to each other, this being the result of arranging an unequal number of balls in the inner and outer grooves with respect to the number of balls in the middle groove. In practice I prefer to arrange three (3) balls in the middle groove and four (4) balls in the inner and outer grooves.

16 indicates yokes, (see Figs. 6 and 7,) which are provided with downwardly-extending legs 17 for supporting said yokes above the bottom ball-race, the legs traveling in the inner and outer grooves of the bottom ball-race. These yokes are provided with teats upon which are received springs 18, the outer ends of said springs being seated in pockets 19, formed in the end walls of the bearing-plate.

20 indicates the spring-followers, arranged in ways formed by the overhanging hoods and trough-shaped flanges. These spring-followers are normally seated against the abutments afforded by the end walls 6 and 9 and confine between them springs 21, which are arranged on teats on the inner ends of the followers. As shown in the drawings, all of the springs are in compression to some extent, and the springs bearing against the opposite ends of the bearing-plate (and the yokes) are under equal compression, so that the balls are held in a position of equilibrium.

In the event of contact with the bearing on the body-transom with the bearing-plate, which contact tends to move the bearing-plate along its ways, the side springs will be under compression by having their followers abut against the end walls 6 or 9 of the overhanging hoods at the advance end of the bearing-plate, while the rear end of the bearing-plate will lift the other set of followers, as is well understood. The rearmost yoke-spring will also be placed under compression, due to the fact that the bearing-plate travels twice the distance of the balls. The foremost yoke-spring will be relieved and will expand to keep its bearing. The yoke-springs are compressed sufficiently in the beginning to permit of this.

From the above it will be seen that when the bearing-plate is shifted in either direction the side springs will be compressed, the foremost followers engaging stationary supports or abutments and the rearmost followers being lifted from their fixed abutments and moved toward the foremost followers. The antifriction device in the form of a group of balls need not under perfect working conditions be attached to the bearing-plate, as the bearing-plate in its movement away from its central position will simply displace the balls and upon its return to central position will restore said balls; but in view of the fact that the shocks and jars to which devices of this character are subject will destroy the relation between the loose members the spring-pressed yokes are employed for holding the balls in proper relation to each other and to their associate parts; also, the springs interposed between the yokes and the bearing-plate are not relied upon for restoring the bearing-plate to a central position, said springs, in fact, not being useful at all in this regard, their function being to hold the balls together in a group and also to center the balls with respect to the bearing-plate. In other words, it is possible in the construction shown in the drawings for the yoke-springs to center the balls with respect to the bearing-plate, notwithstanding the fact that the bearing-plate may be shifted. This result may follow if a load is lifted from the bearing-plate when the bearing-plate is in a shifted position and the balls are retored to a central position with respect to the bearing-plate before the bearing-plate reaches home.

It will be observed that the bottom ball-race is practically open on all sides, so that a free circulation of air is permitted through said ball-race and around the balls, which air tends to keep the ball-race free from dust, cinders, &c. Any dirt or cinders accumulating in the spring-housings will find an exit through the slots or openings in the bottom walls of the trough-shaped flanges.

I am aware that many minor changes in the construction, arrangement, and combination of the several parts of my device can be made and substituted for those herein shown and described without in the least departing from the nature and principle of my invention.

Having thus described my invention, what I claim, and desire to secure by Letters Patent of the United States, is—

1. In a side bearing for cars, the combination with an antifriction device, of a bearing-plate coöperating therewith, guides for said bearing-plate, and resilient means located to the side of the bearing-plate for centering the same irrespective of the position of the antifriction device; substantially as described.

2. In a side bearing for cars, the combination with an antifriction device, of a bearing-plate arranged thereon, and springs located at each side of said bearing-plate for restoring the same to a central position and independently of the position of the antifriction device; substantially as described.

3. In a side bearing for cars, the combination with a shiftable bearing-plate, of an antifriction device coöperating therewith and capable of independent movement with respect to said bearing-plate, and means for centering the antifriction device independently of the position of said bearing-plate; substantially as described.

4. In a side bearing for cars, the combination with a shiftable bearing-plate, of an antifriction device coöperating therewith and capable of independent movement with respect thereto, means for centering said bearing-plate, and independent means for centering the antifriction device under the bearing-plate irrespective of the position of said bearing-plate; substantially as described.

5. In a side bearing for cars, the combination with a shiftable bearing-plate, of springs arranged at each side thereof for restoring the same to a central position, an antifriction device supporting said bearing-plate, and independent means constantly exerting a force to center said antifriction device with respect to the bearing-plate irrespective of the position of said bearing-plate; substantially as described.

6. In a side bearing for cars, the combination with a shiftable bearing-plate, of means tending at all times to restore same to a central position, an antifriction device under said bearing-plate, and independent means for centering said antifriction device with respect to said bearing-plate; substantially as described.

7. In a side bearing for cars, the combination with a shiftable bearing-plate, guides therefor, resilient means for restoring said bearing-plate to a central position, an antifriction device under the bearing-plate, and springs interposed between said antifriction device and the bearing-plate, said springs lying in the plane of travel of said parts; substantially as described.

8. In a side bearing, the combination with a shiftable bearing-plate, of guides therefor, springs arranged at the side edges of said bearing-plate for restoring the same to a central position, an antifriction device under the bearing-plate, and opposing springs bearing at their outer ends against the end walls of the bearing-plate, and at their inner ends against the antifriction device; substantially as described.

9. In a side bearing for cars, the combination with a shiftable bearing-plate, of springs arranged along the side edges thereof, fixed abutments or supports against which the ends of said springs normally find a bearing, and projections at the corners of the bearing-plate for lifting the ends of the springs from their fixed supports whenever the bearing-plate is shifted; substantially as described.

10. In a side bearing for cars, the combination with a shiftable bearing-plate, of single springs arranged at the side edges thereof, followers at the ends of said springs, fixed abutments coöperating with said followers, and projections at the corners of the bearing-plate for lifting the followers from their fixed abutment whenever the bearing-plate is shifted; substantially as described.

11. In a side bearing for cars, the combination of guideways, and a slidable bearing-plate mounted therein, and having a bearing-face which is convexed transversely, said face being formed straight longitudinally; substantially as described.

12. In a side bearing for cars, the combination of guideways, a shiftable bearing-plate having a convexed face, and means for restoring said bearing-plate to a central position; substantially as described.

13. In a lower side bearing for cars, the combination with guideways, a shiftable bearing-plate arranged in and guided by said ways, continuous grooves in the under face of the bearing-plate, balls in said grooves, and means for returning said balls to normal position under said bearing-plate after displacement; substantially as described.

14. In a lower side bearing for cars, the combination with a bearing-plate formed with continuous grooves in its under face, a bottom ball-race, and balls; substantially as described.

15. In a side bearing for cars, the combination with a bearing-plate, a group of staggered balls, and resilient means for centering said group of staggered balls with respect to the bearing-plate; substantially as described.

16. In a lower side bearing for cars, the combination with a bearing-plate formed with continuous grooves in its under face, a base-plate formed with continuous grooves in its upper face, balls in the races thus provided, and resilient means for holding said balls in position; substantially as described.

17. In a lower side bearing for cars, the combination with a bearing-plate, of a group of staggered balls arranged thereunder for supporting the same, and resilient means for restoring said group of staggered balls to a normal position with respect to said bearing-plate after actuation; substantially as described.

18. In a side bearing for cars, the combination with a shiftable bearing-plate, guides for said bearing-plate, resilient means coöperating with the bearing-plate for restoring the same to a central position, balls arranged under the bearing-plate, and independent means coöperating with said bearing-plate, in its different positions, and said balls, for exerting constant energy upon the balls tending to restore them to a central position with respect to the bearing-plate, in all positions of said bearing-plate; substantially as described.

19. In a lower side bearing for cars, the combination with a shiftable bearing-plate with rows of balls arranged thereunder, and a spring-pressed yoke coöperating with the end balls of said rows; substantially as described.

20. In a lower side bearing for cars, the combination with a shiftable bearing-plate, of balls arranged thereunder, a yoke having downwardly-extending supporting-legs, and a spring interposed between said yoke and said bearing-plate; substantially as described.

21. In a lower side bearing for cars, the combination with a shiftable bearing-plate provided with grooves in its under face forming a ball race, of a bottom supporting ball-race, rows of balls in said races, yokes embracing the end balls of the row, and springs interposed between said yokes and the under walls of the bearing-plate; substantially as described.

22. In a side bearing for cars, the combination with the ball-races composed of hard metal, and formed with concentric grooves, balls fitting in said grooves between said races, and reinforcing ductile metal for said ball-races; substantially as described.

23. In a lower side bearing, the combination with ball-races formed with continuous concentric grooves, of balls therein, and means for preserving the relation of said balls to each other; substantially as described.

24. In a lower side bearing for cars, the combination of a shiftable bearing-plate and a bottom ball-race, the latter being formed with continuous concentric grooves, of rows of balls in said grooves, yokes coöperating with the end balls of said rows, and springs bearing against said yokes in line with the middle row of balls, the outer ends of said springs engaging the bearing-plate; substantially as described.

25. In a lower side bearing for cars, the combination with a shiftable bearing-plate having spring-seats at its ends, of an antifriction device arranged under said bearing-plate, springs interposed between said antifriction device and the spring-seats at the ends of the bearing-plate, and elongated teats for supporting said springs; substantially as described.

In testimony whereof I hereunto affix my signature, in the presence of two witnesses, this 13th day of August, 1901.

JOHN C. WANDS.

Witnesses:
E. B. LEIGH,
E. T. WALKER.